United States Patent

Meyerle

[15] 3,659,266

[45] Apr. 25, 1972

[54] BURGLAR ALARM SYSTEM

[72] Inventor: George M. Meyerle, 133-06 115th Street, South Ozone Park, N.Y. 11420

[22] Filed: July 28, 1969

[21] Appl. No.: 845,307

[52] U.S. Cl. .................................. 340/64, 180/114, 340/63
[51] Int. Cl. ..................................................... B60r 25/10
[58] Field of Search ..................... 340/63, 64, 52, 213, 276; 180/114

[56] References Cited

UNITED STATES PATENTS

| | | | |
|---|---|---|---|
| 3,585,584 | 6/1971 | Behrend | 340/64 |
| 3,531,793 | 9/1970 | Shottenfeld | 340/276 |
| 3,025,506 | 3/1962 | McDonough | 340/276 |
| 3,546,688 | 12/1970 | Jensen et al. | 340/276 |
| 3,487,397 | 12/1969 | Kaplan et al. | 340/276 |
| 3,041,477 | 6/1962 | Budts et al. | 340/276 |
| 3,179,818 | 4/1965 | Urban | 340/276 |
| 3,329,935 | 7/1967 | Wiggins | 340/63 |
| 3,422,398 | 1/1969 | Rubin | 340/63 |

Primary Examiner—John W. Caldwell
Assistant Examiner—Glen R. Swann, III
Attorney—Smythe & Moore

[57] ABSTRACT

An alarm system for indicating unauthorized entry into an enclosure such as the interior portion of a motor vehicle, home or the like, wherein a protective switch initiates operation of solid state circuitry thereby to effect time delayed operation of an alarm device. Circuitry operated by a key switch, such as the ignition switch of a motor vehicle, defeats actuation of the alarm circuits for a predetermined time following operation of the key switch thereby to effect authorized entry into the exit from the protected enclosure without sounding the alarm. A further manually operated and interiorly located disconnect switch provides for disconnecting the alarm actuating circuitry. Once actuated, however, the alarm continues to operate for a predetermined time despite inactuation of the protective switch or the manual disconnect switch.

1 Claims, 1 Drawing Figure

PATENTED APR 25 1972
3,659,266
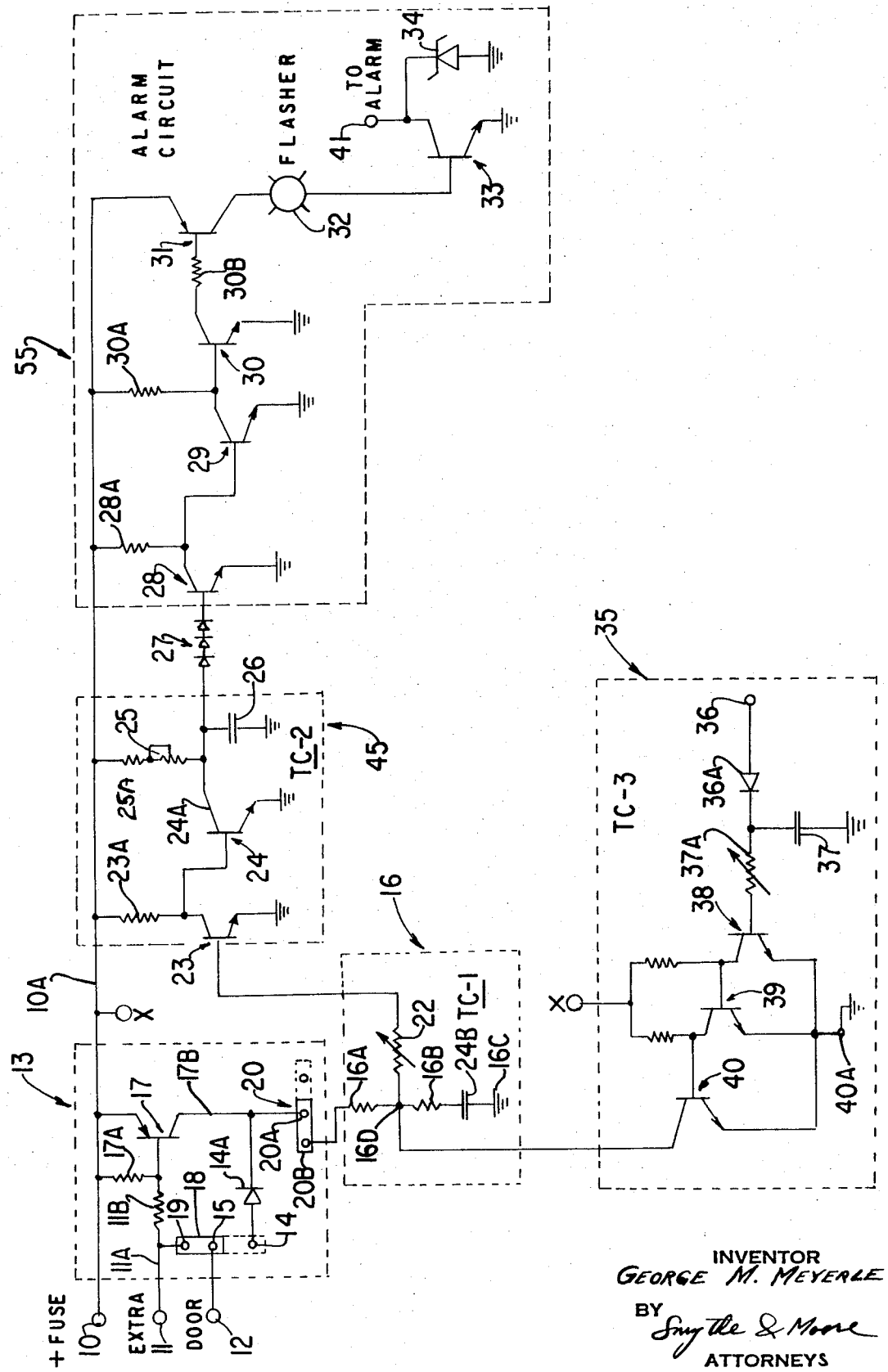
INVENTOR
GEORGE M. MEYERLE
BY Smythe & Moore
ATTORNEYS

BURGLAR ALARM SYSTEM

This invention relates to burglar alarm systems and more particularly to a solid state system for indicating unauthorized entry into an enclosure, such as the interior part of a motor vehicle or the like.

Various devices for giving an alarm upon unauthorized tampering with a door, window, compartment or the like of a motor vehicle or other enclosure have been proposed in the past. Such devices, however, either involved electro-mechanical components or were otherwise deficient in certain desired aspects.

An object of the present invention therefore is to provide an improved alarm system for protection against unauthorized opening of a protected enclosure such as the interior parts of a motor vehicle, home or the like.

Another object is to provide an alarm system, particularly adapted for motor vehicles or the like, which is devoid of electro-mechanical moving parts such as relays or the like.

Another object is to provide automatic operation not requiring setting of the alarm when leaving the enclosure.

Another object is to provide an alarm without the use of an outside key or switch.

A further object is the provision of an alarm system consisting primarily of solid state circuit components.

A still further object is the provision of an alarm system wherein a plurality of electronic timing circuits provide for predetermined delay in operation of the alarm.

Another object is to provide an alarm system in which a switch-operated timing circuit provides for deactivating the alarm by deactivating the aforesaid timing circuits.

A still further object is the provision of an alarm system as aforesaid in which the alarm system continues to operate for a predetermined time despite deactivation of the alarm initiating means and the resetting of the circuit to the secure position after alarm stops.

Yet another object is the provision of an alarm system capable of operation regardless of the polarity of the protective devices connected thereto.

In one aspect, the invention comprises a timing circuit operated by one or more protective switches and which in turn controls a second timing circuit thereby to control the operation of an alarm circuit. The several timing circuits and the alarm circuit all comprise solid state components. Activation of the system is initiated by unauthorized tampery with a door, window, or other enclosed compartment such as the interior portions of a motor vehicle or the like.

In a second aspect, a third key-operated timing circuit provides for activation of the protective circuit only after a predetermined time.

In a third aspect, the alarm keeps operating for a predetermined time despite reclosing of the entrance into a protected enclosure, and resets itself automatically to the secure state after the alarm turns off.

The above and other objects, advantages and features of the invention will be apparent from the following description taken in conjunction with the accompanying drawing.

IN THE DRAWING

The sole FIGURE is a schematic wiring diagram illustrating an exemplary embodiment of the invention.

Referring to the drawing, the alarm system is shown as comprising a switch unit indicated generally by the dashed box 13, a first timing circuit TC-1 indicated by the dashed box 16, a second timing circuit TC-2 indicated by the dashed box 45, an alarm switching circuit indicated by the dashed box 55, and a third timing circuit TC-3 indicated by the dashed box 35. More particularly, there is shown a terminal 10 adapted to be connected to any suitable source of positive power such as the dome light fuse of a motor vehicle, an auxiliary or extra terminal 11 adapted for connection to one or more protective switches for protecting any desired structure such as the hood, trunk, and windows of a motor vehicle, and a terminal 12 adapted for connection to a door operated switch such as the customary dome light switch of a motor vehicle.

The terminal 10 is connected to a line 10A providing a plus bus for the various circuits of the system. The terminal 11 is connected through a line 11A and resistance 11B to the base of a transistor 17 having its emitter connected to the bus 10A and a resistance 17A connected between the lines 10A and base to reduce collector emitter leakage of the transistor. The terminal 12 is directly connected to the contact 15 of a two-way switch 18. When the switch 18 is in one position (shown by solid lines in the drawing), it connects the contact 15 to a contact 19 and, when in its second position (shown by dashed lines), it connects the contact 15 to a contact 14. The contact 19 is connected to the line 11A while the contact 14 is connected through a diode 14A to a line 17B connecting the collector of transistor 17 to the contact 20A of a disconnect switch 20. The switch 20 has two positions, one (shown in solid line) wherein it connects the contact 20A to a contact 20B, and a second (shown in dashed lines) in which the circuit from line 17B is opened. The disconnect switch 20 may be located at any desired place (concealed if desired) within the vehicle or other enclosure to be protected and provides for deactivating the alarm system for any desired period of time such as when working on a vehicle motor, removing articles from the interior parts of a vehicle or other protected enclosure, and the like. Switch 20 will not deactivate the alarm after once being triggered.

The primary purpose of the switch unit 13 is to readily adapt the alarm system of the invention to the two types of door operated switches commonly employed on motor vehicles. In one type, the switch is connected to a "hot" wire, thereby to supply power to a dome light or the like. In such a system, the switch 18 would be positioned in the dashed position whereby power from the door switch would be directly applied to the line 17B and switch 20 through contact 14 and diode 14A. In the other type, the door switch is grounded, and in this case switch 18 would be in the solid line position thus to connect the base of transistor 17 to ground through contact 19 and effect conduction of the transistor to supply power to the switch 20. Energization of the switch 20 through conduction of transistor 17 may also be effected by connecting the terminal 11 to ground through one or more of the auxiliary or extra switches heretofore described.

The timing circuit TC-1 comprises a resistance 16A, a resistance 16B, and a capacitance 24B connected between the terminal 20B of switch 20 and a ground 16C. Discharge from the timing circuit TC-1 is controlled by a variable resistance 22 connected between the junction 16D of TC-1 and the base of a transistor 23 (timing circuit TC-2) having its collector connected to the bus 10A through biasing resistance 23A and its emitter connected to ground. The collector of transistor 23 is connected to the base of a transistor 24 having its emitter connected to ground and its collector connected to the bus 10A through a line 24A, a potentiometer 25 and resistor 25A. A grounded capacitance 26 is connected to the line 24A on the far side of potentiometer 25 and provides an RC charging circuit through potentiometer 25 when not shorted by transistor 24 which is turned off when transistor 23 is turned on.

The charge on the capacitance 26 is transferred through a plurality (one to 10, for example, and three being shown in the drawing) of series connected diodes 27 to the base of a transistor 28 having its collector connected to bus 10A through biasing resistance 28A and its emitter connected to ground. Diodes 27 also could be zener diodes. The collector of transistor 28 is connected to the base of transistor 29 having like biasing and ground connections whereby transistor 29 turns off when transistor 28 turns on. The series connected diodes 27, depending upon the number and their breakdown voltage, determine the point in the exponential rise of the charge on capacitance 26 at which transistor 28 turns on and transistor 29 turns off. A further time delay in operation of the alarm may thus be realized.

The collector of transistor 29 is connected to the base of a transistor 30 having its emitter connected to ground and biased by the same resistance 30A as the transistor 29. The collector of transistor 30 is connected through a resistance 30B to the base of a transistor 31 having its emitter connected to the bus 10A and its collector connected through a flasher switch 32 and to the base of transistor 33. When transistor 29 is turned off, transistors 30 and 31 are turned on thereby to activate the transistor 33 and complete a circuit to an alarm through the terminal 41. In the illustrated embodiment of the invention, the terminal 41 is adapted to be connected in shunt with the usual horn switch of a motor vehicle, thereby intermittently to sound the horn as a result of flasher 32. Flasher 32 may be any well-known flashing lamp bulb or it may be replaced by a steady lamp or other resistance if it is desired to operate a siren or the like.

In order to temporarily deactivate the alarm system, such as upon the leaving of a vehicle or other protected enclosure, a third timing circuit TC-3 is provided. This circuit comprises a terminal 36 adapted for connection to an ignition or other key operated switch, a diode 36A, a capacitance 37 connected to ground, and a variable resistance 37A. Resistance 37A is connected to a well-known transistor switching circuit comprising the transistors 38, 39 and 40 having a bias connection to the bus 10A through terminals X—X and a ground connection through the terminal 40A. The connections of this circuit are such that when an ignition key or the like is operated to an "on" position, the capacitance 37 is charged thereby to effect short-circuiting or deactivation of the timing circuit TC-1 through transistor 40. Thus, when a protective switch is activated and causes charging of TC-1 through 16A, and TC-3 is not effective as a shunt, transistor 23 will conduct and after a predetermined time, transistor 28 will conduct so as to cause conduction of transistors 30 and 31 to activate the alarm. After the protective switches or doors are closed, power will be removed from TC-1 through switch 20 and the RC circuit of TC-1 will discharge to the ground in a predetermined time and the alarm will then be shut off automatically.

There is thus shown and described a burglar alarm system which is particularly adapted for the protection of a motor vehicle or the like but is also useful for the protection of any desired enclosure, such as a home. It will be apparent from the foregoing description that the key-operated time delay circuit TC-3 inactivates or defeats the alarm for a predetermined time after operation of the switch by shunting the alarm timing circuits TC-1 and TC-2. Thus, actuation of the alarm circuit is delayed during exit from the protected enclosure. The time delay circuits TC-1 and TC-2 permit authorized entry into the enclosure during the period between such entry into the enclosure and operation of the defeat switch connected to the terminal 36. The interiorly located switch 20, as above described, disconnects the alarm circuit but cannot defeat sounding of the alarm once started by the protective switches. As above noted, the key-operated switch connected to the terminal 36 may be the ignition switch in the application of the invention to a motor vehicle.

What is claimed is:

1. In an alarm system adapted for operation upon unauthorized entry into an enclosure such as an interior part of a motor vehicle or the like, the combination which includes a protective switch means, an alarm means, a source of power connectable to said alarm means, a first timing means having an RC network connectable to said protective switch means and chargeable by operation of said protective switch means, second timing means having an RC network connected to said first timing means, said second timing means having an output which is energized a predetermined time after said second timing means is energized by said first timing means and deenergized when said first timing means is deenergized, said alarm means being connected to said second timing means output and operable during the time said second timing means is energized, third timing means having an RC network connected to a key means in said interior and charged when said key means is in an on condition, a shunt connection between said third timing means and said first timing means shunting the first timing means so that said alarm is not energized until said key means is turned to an off condition and the third timing means is deenergized a predetermined time thereafter to remove a shunt across said first timing means, removal of said shunt permitting said first timing means RC network to charge when said protective switch is energized so as to connect said source of power to sound the alarm means after a predetermined time interval and to discharge after the protective switch means is deenergized so as to deenergize the second timing circuit and disconnect said source of power from said alarm means after a predetermined interval so as to shut off said alarm means.

* * * * *